United States Patent
Yardumian et al.

(10) Patent No.: US 7,055,092 B2
(45) Date of Patent: May 30, 2006

(54) DIRECTORY FOR MULTI-PAGE SVG DOCUMENT

(75) Inventors: Richard Krikor Yardumian, Orange, CA (US); Loren A. Wood, Lakewood, CA (US); Christopher John Carcerano, Aliso Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 10/004,447

(22) Filed: Dec. 5, 2001

(65) Prior Publication Data

US 2003/0126557 A1  Jul. 3, 2003

(51) Int. Cl.
*G06F 15/00* (2006.01)
(52) U.S. Cl. .................... 715/513; 715/501.1
(58) Field of Classification Search ............... 715/513, 715/501.1, 500, 838, 530, 846; 345/660, 345/838
See application file for complete search history.

(56) References Cited

U.S. PATENT DOCUMENTS

| | | | | |
|---|---|---|---|---|
| 5,113,341 A | * | 5/1992 | Kozol et al. .............. 715/531 |
| 5,185,698 A | * | 2/1993 | Hesse et al. .............. 715/531 |
| 5,887,133 A | * | 3/1999 | Brown et al. ............. 709/200 |
| 5,926,824 A | | 7/1999 | Hashimoto ............... 715/520 |
| 5,999,912 A | * | 12/1999 | Wodarz et al. ............ 705/14 |
| 6,088,707 A | * | 7/2000 | Bates et al. ............. 715/501.1 |
| 6,138,129 A | * | 10/2000 | Combs ..................... 707/6 |
| 6,209,036 B1 | | 3/2001 | Aldred et al. ............. 709/229 |
| 6,453,078 B1 | * | 9/2002 | Bubie et al. .............. 382/305 |
| 6,510,434 B1 | * | 1/2003 | Anderson et al. .......... 707/100 |
| 6,542,911 B1 | * | 4/2003 | Chakraborty et al. ....... 707/206 |
| 6,544,295 B1 | * | 4/2003 | Bodnar .................... 709/219 |
| 6,564,251 B1 | * | 5/2003 | Katariya et al. .......... 709/214 |
| 6,585,776 B1 | * | 7/2003 | Bates et al. ............. 715/501.1 |
| 6,606,620 B1 | * | 8/2003 | Sundaresan et al. ........ 707/3 |
| 6,643,633 B1 | * | 11/2003 | Chau et al. ............... 707/1 |
| 6,665,659 B1 | * | 12/2003 | Logan .................... 707/3 |
| 6,741,242 B1 | * | 5/2004 | Itoh et al. ................ 345/419 |
| 6,810,429 B1 | * | 10/2004 | Walsh et al. .............. 709/246 |
| 6,886,131 B1 | | 4/2005 | Kusama et al. ............ 715/513 |
| 2002/0049961 A1 | * | 4/2002 | Fang et al. ............... 717/127 |
| 2002/0059337 A1 | * | 5/2002 | Takaoka et al. ........... 707/500 |
| 2002/0091738 A1 | | 7/2002 | Rohrabaugh et al. ....... 707/523 |
| 2002/0111966 A1 | | 8/2002 | Fukuda et al. ............. 707/513 |
| 2002/0138562 A1 | * | 9/2002 | Wies et al. ............... 709/203 |
| 2002/0163545 A1 | * | 11/2002 | Hii ....................... 345/838 |
| 2003/0076365 A1 | * | 4/2003 | Sesek et al. .............. 345/838 |
| 2005/0166145 A1 | * | 7/2005 | Silverbrook et al. ........ 715/530 |

FOREIGN PATENT DOCUMENTS

| | | |
|---|---|---|
| JP | 8-147445 | 6/1996 |
| JP | 2000-312290 | 11/2000 |

OTHER PUBLICATIONS

Probets et al., Vector Graphics : Form PostScript and Flash to SVG, ACM Nov. 2001, pp. 135-143.*

(Continued)

*Primary Examiner*—Cong-Lac Huynh
(74) *Attorney, Agent, or Firm*—Fitzpatrick, Cella, Harper & Scinto (57) ABSTRACT

An XML-based document which includes text for plural pages also includes directory information which stores location pointers for each of the plural pages. Preferably, the XML-based document is a document that conforms to the scalable vector graphics (SVG) standard. An authoring tool and a viewer are disclosed.

19 Claims, 5 Drawing Sheets

OTHER PUBLICATIONS

Pietriga et al., VXT : A Visual Approach to XML Transformations, ACM Nov. 2001, pp. 1-10.*

Al-Shamma, et al. (Adobe Systems Inc.), "Precision Graphics Markup Language (PGML)", World Wide Web Consortium Note 10, Apr. 1998.

Adobe Systems, Inc., "PDF Reference", second edition, Adobe Portable Document Format Version 1.3, Jul. 2000, pp. 75-85 and 385-398.

Cover Pages, "W3C Scalable Vector Graphics (SVG)", Apr. 30, 2000.

PDFReference.pdf—"PDF Reference, Third Edition, Adobe Protable Document Format, Version 1.4", Adobe Systems, Inc., Nov., 2001.

REC-SVG-20010904.pdf: "Scalable Vector Graphics (SVG) 1.0 Specification", World Wide Web Consortium (W3C), Sep. 4, 2001.

"Adobe Solutions Network: Acrobat 5.0 SDK Documentation", <http://partners.adobe.com/asn/developer/acrosdk/docs.html>, visited Dec. 3, 2001.

"W3C Scalable Vector Graphics (SVG)", <http://www.w3.org/Graphics/SVG/Overview.htm8>, visited Dec. 3, 2001.

"SVG maker", <http://www.sgvmaker.com/tech.htm>, visited Dec. 3, 2001.

CDROM containing documents (1) and (2).

"PostScript to SVG Conversion", <http://broadway.cs.nott.ac.uk/projects/SVG/ps2svg/> , visited Dec. 14, 2001.

"Adobe Systems Inc. Adobe Acrobat 4.0 to Convert Every Document Into A Format Openable In Any Environment", PC Fan, vol. 6, No. 12, Jul. 1, 1999 (p. 192) (and English language translation thereof).

* cited by examiner

DIRECTORY FOR MULTI-PAGE SVG DOCUMENT

BACKGROUND OF THE INVENTION

1. Field of the Invention

The present invention relates to multi-page SVG-formatted documents (where "SVG" refers to Scalable Vector Graphics), and particularly relates to new element types that define a document directory including location information of each page. The invention also relate, to authoring tools for such multi-page documents, as well as to viewers for viewing such documents.

2. Description of the Related Art

Scalable vector graphics ("SVG") is a language for describing two-dimensional graphics in extensible markup language ("XML"). SVG allows for three types of graphic objects: vector graphic shapes, images, and text. An SVG document is a plain-text document which includes plain-text descriptions of the graphics objects and their attributes, such as text which describes where the object is located (a "URI") or how to draw the object. The text is delimited by an opening tag and an accompanying closing tag which are collectively known as "element types". As an example, a "title" element type might delimit text with an opening tag of the form <title> and a closing tag of </title>, although some element types might include opening and closing tags in a single line.

The SVG language is maintained and defined by the World Wide Web Consortium (W3C), and details on the current grammar for SVG can be found at W3C's web site www.w3c.org. The current definition of SVG is defined by W3C in "Scalable Vector Graphics (SVG) 1.0 specification: W3C Recommendation 4 Sep. 2001" available at the aforementioned web site and incorporated herein by reference. The specification includes the document type definition for SVG. A "document type definition" defines the rules and grammar to which the plural element types conform.

As conceived by the W3C, SVG defines a graphical object viewable in a graphic window inside a document. More recently, however, it has been considered to extend the concept of SVG to that of a document itself, including multi-page documents.

One such example has been proposed by the assignee of the present invention at application Ser. No. 09/661,387, filed Sep. 13, 2000, entitled "A Scalable Vector Graphics Print Driver". According to this application, the contents of which are incorporated herein by reference, a print driver accepts print output from an application program and, rather than generating information for a printer, instead generates an SVG document. The document may include multiple pages. The resulting SVG document may thereafter be used for any suitable purpose, such as posting on the Internet or inclusion in web pages. Moreover, because the SVG document is plain text and the SVG grammar is platform-independent, the SVG document can be transferred to users across computing platforms and thereby serves as a platform-independent document format.

Through use of the print driver defined in the aforementioned application Ser. No. 09/661,387, any application program that supports printing can output an SVG-formatted document thereby achieving platform independence for the output of any application that prints.

Another effort in developing print drivers that output SVG-formatted documents is provided by SVGmaker™ developed by Software Mechanics Party Ltd. of Brisbane, Australia, for which information is provided in its web site at www.svgmaker.com.

One problem recently encountered with multi-page SVG-formatted documents involves rendering and viewing such documents. Because SVG was originally conceived as a format for a graphic in a single window, to render the document in preparation for viewing it is necessary to parse the entire document, from beginning to end. For multi-page documents, however, parsing the entire document is time-consuming, particularly if the document includes many pages. Moreover, because the document cannot be completely rendered or viewed until parsing is completed, large delays are encountered even when viewing just one page of the document, or in moving from page to page.

SUMMARY OF THE INVENTION

It is an object of the invention to provide element types that define a document directory structure, with the document directory structure including at least information concerning the location of individual pages in the SVG document. Because the location of individual pages in the SVG document can be determined, a viewer need only parse the locations needed to render a view of the current page.

Thus, in one aspect, the invention involves an XML-based document such as SVG which includes text delimited by plural element types respectively defining at least vector graphic shapes, images and text, with each element type having an opening tag and a corresponding closing tag which collectively conform to a document type definition that defines rules for the plural element types. The XML-based document includes text for plural pages as well as page-information text, wherein the page-information text is delimited by page-information element types that define locations in the document of the text for each of the plural pages. Preferably, the XML-based document further includes document-resource text delimited by document-resource element types that define resources (such as font definitions and the like) applicable across multiple pages or globally across the entire XML-based document.

Because of the page-information text, a viewer rendering the XML-based document is not necessarily required to parse the entire XML-based document. Rather, it need only parse those locations in the document identified by the page-information text. Moreover, because the page-information text is delimited by page-information element types, the viewer can locate the page-information text quickly.

Moreover, because of the document-resource text which is likewise delimited by document-resource element types, the viewer can quickly locate and process resources that are applicable across multiple pages or globally applicable.

In particularly preferred embodiment, the XML-based documents includes a location pointer, at or near the beginning of the document, to directory-table text delimited by director-table element types that directly or indirectly define the location of the page-information element types. By virtue of these location pointers, a viewer parses the document even more quickly, since it is able to pinpoint exactly the locations within the document for which parsing is needed for any particular page.

Preferably, the directory-table directly or indirectly includes information concerning the document-resource text, as well as information concerning thumbnail images for pages of the text and document attributes such as author and creation date.

Further aspects of the invention involve an authoring tool such as a print driver for authoring XML-based documents according to the invention, as well as a viewing tool for parsing, rendering and viewing such XML-based documents.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
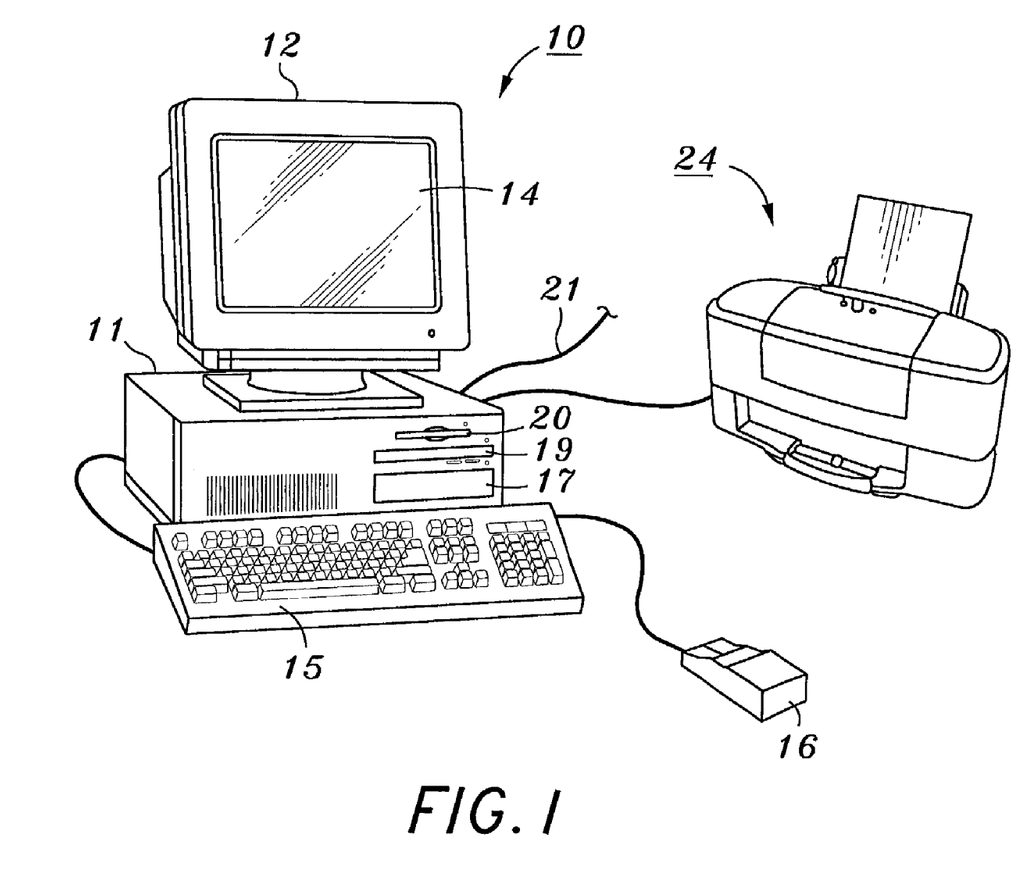
FIG. 1 is a view illustrating the outward appearance of computing equipment embodying the present invention.

FIG. 1 is a view showing the outward appearance of representative computing equipment 10 which includes image-based gamut mapping according to the invention. Computing equipment 10 includes host processor 11 which comprises a personal computer (hereinafter "PC") preferably having a windowing operating system such as Microsoft Windows, Xwindows or MacIntosh operating systems. Provided with computing equipment 10 are color monitor 12 including display screen 14, keyboard 15 for entering text data and user commands, and pointing device 16. Pointing device 16 preferably comprises a mouse, for pointing, selecting and manipulating objects displayed on display screen 14.

Computing equipment 10 includes a computer-readable memory medium such as a fixed disk 17 and/or floppy disk drive 19 and/or CDROM drive 20. Such computer readable memory media allow computing equipment 10 to access information such as image data, computer executable process steps, application programs, and the like, stored on removable and non-removable memory media. In addition, network access 21 allows computing equipment 10 to acquire information, images and application programs from other sources, such as a local area network or the Internet, or from digital cameras or digital video cameras.

Figure 2:
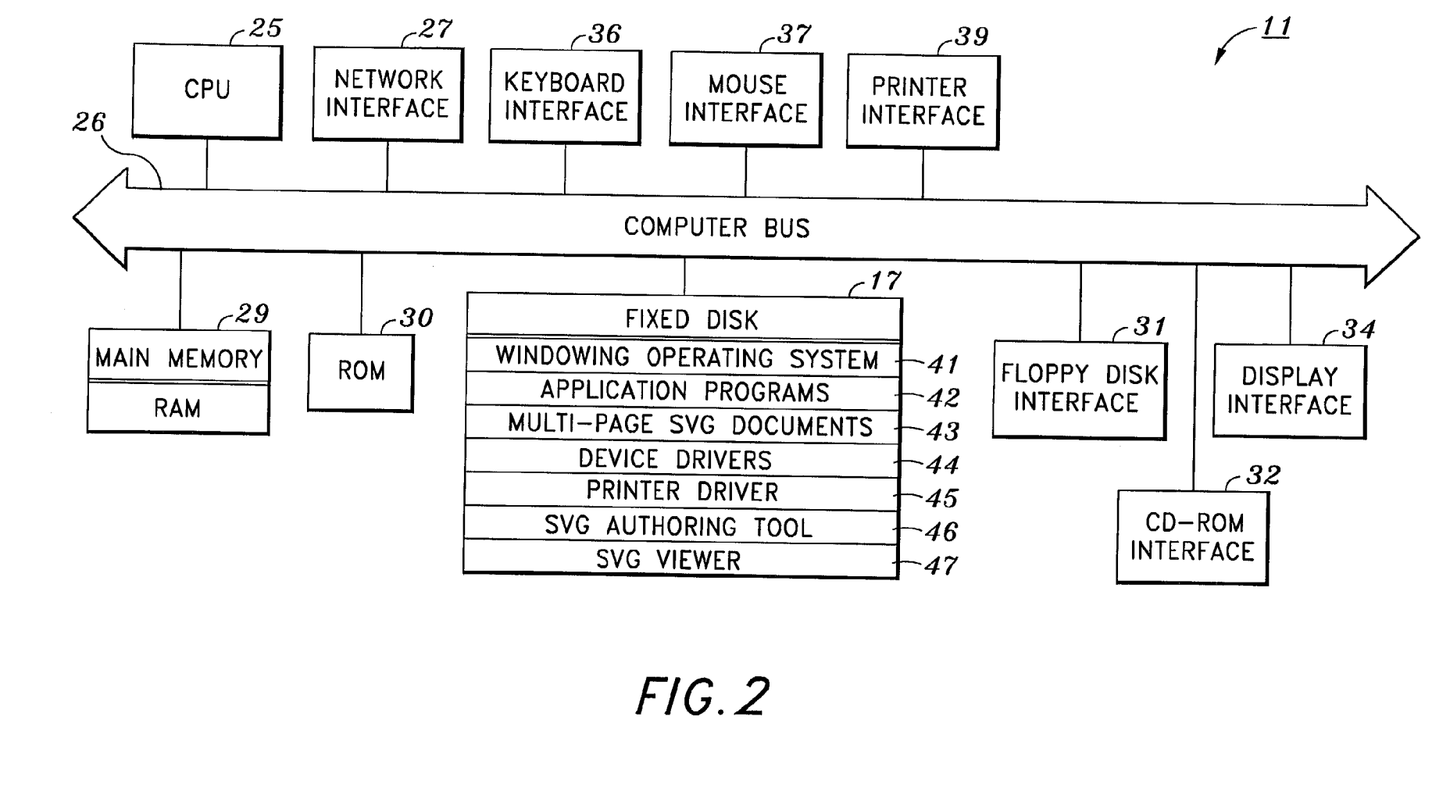
FIG. 2 is a detailed block diagram of the computing equipment shown in FIG. 1.

FIG. 2 is a detailed block diagram showing the internal architecture of PC 11. As shown in FIG. 2, PC 11 include, central processing unit ("CPU") 25 that interfaces with computer bus 26. Also interfacing with computer bus 26 are fixed disk 17, network interface 27 for network access 21, random access memory ("RAM") 29 for use as main memory, read only memory ("ROM") 30, floppy disk interface 31, CDROM interface 32, display interface 34 to monitor 12, keyboard interface 36 to keyboard 15, mouse interface 37 to pointing device 16, and printer interface 39 to printer 24.

Main memory 29 interfaces with computer bus 26 so as to provide RAM storage to CPU 25 during execution of software programs such as the operating system, application programs, and device drivers. More specifically, CPU 25 loads computer-executable process steps from disk 17 or other memory media into a region of main memory 29, and thereafter executes the stored process steps from main memory 29 in order to execute software programs.

As also shown in FIG. 2, fixed disk 17 contains a window operating system 41, application programs 42 such as application programs that obtain, manipulate, and print multi-page documents, multi-page SVG documents 43, device drivers 44 such as printer driver 45, SVG authoring tool 46 which authors multi-page SVG documents, and an SVG viewer 47 which reads SVG data files including multi-page SVG files and displays them on monitor 12.

Authoring of multi-page SVG documents according to the invention is preferably implemented as part of printer driver 45, but it may be implemented as a stand-alone software application program. It is also possible to implement the authoring tool as a dynamic link library ("DLL"), or as a plug-in to other application programs such as Word™ from Microsoft Corporation or QuarkXPress™ from Quark, Inc. Likewise, SVG viewer 47 is preferably implemented as a stand-alone software application program, but can be implemented as a DLL or a plug-in to another program such as Internet Explorer™ from Microsoft Corporation.

Authoring tool 46 is arranged to output XML-based documents which include text delimited plural element types respectively defining at least vector graphic shapes, images, and text. Each element type has an opening tag and a corresponding closing tag which collectively conform to a document type definition that defines rules and grammar for the plural document types. Preferably, the XML-based document is an SVG-formatted document according to the W3C standard, in which case the document type definition (hereinafter "DTD") is that defined by the W3C and augmented by the DTD described below.

The SVG-based document includes text for plural pages. The text need not be the text that actually appears in the rendered document, but rather might include text that signifies a web-based URI where the text might be located, or text that includes other SVG-based element types for defining aspects of each page of the document. Preferably, text for each page of the document is grouped together with other aspects of the page, but it is possible that the text of the page is disjointed and dispersed throughout the SVG document so long as the page location information (described below) properly identifies the location of all elements in any one page.

In outputting text for the XML-based document, authoring tool 46 also outputs text that defines resources used by one or more of the pages, or used globally by all of the pages. Such resources include, for example, font definitions, shapes, clip regions and the like.

Authoring tool 46 also outputs directory-exists text delimited by directory-exists element types that signify that the SVG document contains directory information which, in turn, directly or indirectly indicates location of each page in the multi-page document. Preferably, the directory-exists text is located at or near the beginning of the SVG document, so that a viewer parsing the SVG document will encounter it early and be able to locate and retrieve location information of each page of text without necessarily parsing the entire SVG document. Such directory information is preferably written by authoring tool 46 at the end of the SVG document, so as to simplify parsing by viewers.

In the present invention, the directory-exists text points to a directory-table element which, in turn, indirectly provides location information for each page in the multi-page document. The reason for indirect information is to permit additional layers of abstraction in the overall directory structure, thereby achieving a more generalized and extensible directory description of the document.

The directory-table element includes directory-table text delimited by directory-table element type, and merely includes an additional location pointer to table-list text. This level of indirection is desirable since it ensures that the directory-table text is always located at the same position (relative to the end of the SVG document) in all multi-page SVG documents according to the invention.

The directory-table-list text includes text delimited by directory-table-list element types that define at least one directory-definition element followed by zero or more doc-resource elements. The doc-resource elements includes text specifying a location pointer for resources in the SVG document that are applicable across one or more of the pages such as font definitions, and the like. The doc-resources text is delimited by doc-resources element types.

The directory-definitions text is delimited by directory-definition element types and specifies the location of a directory-table-information element. The directory-information-element, in turn, includes text specifying the number of pages in the document as well as at least one page-directory element. The directory-information text further may include zero or more thumbnail directory elements and doc-attribute elements.

The page-directory text element contains one page-information element for each page in the SVG document. Each page-information element, in turn, includes text that specifies the location in the SVG document of text corresponding to each page of the multi-page document. Preferably, each page of the SVG document is grouped together, such that only one page-information element is needed for each page, but it is possible to include more than one page-information element in a case where text for each page is dispersed throughout the multi-page document.

Returning to the directory-information element, this element may also include zero or more thumbnail-directory elements and zero or more document-attribute elements. The thumbnail-information elements contain definitions for thumbnail graphics that represent each page in the multi-page document. The document-attributes element includes document attributes such as author and creation date.

[Document Type Definition ("DTD")]

The foregoing provides a brief description of the elements for the document directory. A complete copy of the preferred DTD follows and is used to augment the DTD provided by W3C for SVG documents:

```
<!ELEMENT docDirectoryExists EMPTY>
<!ATTLIST docDirectoryExists
    offset %Integer; #REQUIRED>
<!ELEMENT pageStart EMPTY>
<!ATTLIST pageStart>
<!ELEMENT pageEnd EMPTY>
<!ATTLIST pageEnd>
<!ELEMENT docDirectoryTable EMPTY>
<!ATTLIST docDirectoryTable
    offset %Integer; #REQUIRED
    byteCount %Integer; #REQUIRED >
<!ELEMENT docDirectoryDefs EMPTY>
<!ATTLIST docDirectoryDefs
    offset %Integer; #REQUIRED
    byteCount %Integer; #REQUIRED >
<!ELEMENT docResources EMPTY>
<!ATTLIST docResources
    offset %Integer; #REQUIRED
    byteCount %Integer; #REQUIRED >
```

-continued

```
<!ELEMENT directoryTableList (docDirectoryDefs, docResources*)>
<!ATTLIST directoryTableList>
<!ELEMENT docPageDir (docPageInfo+) >
<!ATTLIST docPageDir>
<!ELEMENT docThumbnailDir (docThumbnailInfo*) >
<!ATTLIST docThumbnailDir>
<!ELEMENT docPageInfo EMPTY>
<!ATTLIST docPageInfo
    pageNumber %Integer; #REQUIRED
    offset %Integer; #REQUIRED
    byteCount %Integer; #REQUIRED
    width %Length; #REQUIRED
    height %Length; #REQUIRED
    color (true | false) #IMPLIED >
<!ELEMENT docThumbnailInfo (image)>
<!ATTLIST docThumbnailInfo
    pageNumber %Integer; #REQUIRED >
<!ELEMENT docAttributes EMPTY>
<!ATTLIST docAttributes
    author          CDATA    #IMPLIED
    creationDate    CDATA    #IMPLIED
    modifiedDate    CDATA    #IMPLIED
    title           CDATA    #IMPLIED
    subject         CDATA    #IMPLIED
    lastSavedBy     CDATA    #IMPLIED
    revisionNumber  CDATA    #IMPLIED
    applicationName CDATA    #IMPLIED
    companyName     CDATA    #IMPLIED
    lastViewedDate  CDATA    #IMPLIED
    lastViewedBy    CDATA    #IMPLIED
    keywords        CDATA    #IMPLIED
    originalFileName CDATA   #IMPLIED >
<!ELEMENT docDirectoryInfo (docPageDir, docThumbnailDir,
docAttributes) >
<!ATTLIST docDirectoryInfo
    pageCount %Integer; #REQUIRED >
```

[Definitions of Element Types]

A more complete definition of the elements is provided below:

[docDirectoryExists Element]

The docDirectoryExists element indicates that the SVG document file contains directory information and specifies the location (byte offset from the end of the file) of the docDirectoryTable element.

```
<!Element docDirectoryExists EMPTY>
<!ATTLIST docDirectoryExists
    offset %Integer; #REQUIRED >
```

Attribute Definitions:

offset="<integer>": The byte offset from the end of the document file to the docDirectoryTable element.

[docDirectoryTable Element]

The docDirectoryTable element specifies the location (byte offset from the end of the file) and size (byte count) of the directoryTableList element.

```
<!Element docDirectoryTable EMPTY>
<!ATTLIST docDirectoryTable
    offset %Integer; #REQUIRED
    byteCount %Integer; #REQUIRED >
```

Attribute Definitions:

offset="<integer>": The byte offset from the end of the document file to the directoryTableList element. The value string consists of four digits left padded with zeros.

byteCount="<integer>": The length of the directoryTableList element in bytes. The value string consists of four digits left padded with zeros.

[directoryTableList Element]

The directoryTableList element contains one docDirectoryDefs element followed by zero or more docResources elements.

```
<!Element directoryTableList (docDirectoryDefs, docResources*)>
    <!ATTLIST directoryTableList>
```

Attribute Definitions:
None

[docDirectoryDefs Element]

The docDirectoryDefs element specifies the location (byte offset from the beginning of the file) and size (byte count) of the directoryTableInfo element.

```
<!Element docDirectoryDefs EMPTY>
<!ATTLIST docDirectoryDefs
    offset %Integer; #REQUIRED
    byteCount %Integer; #REQUIRED >
```

Attribute Definitions:

offset="<integer>": The byte offset from the beginning of the document file to the docDirectoryInfo element.

byteCount="<integer>": The length of the directoryDefinitions element in bytes.

[docResources Element]

The docResources element specifies the location (byte offset from the beginning of the file) and size (byte count) of SVG definitions (embedded font definitions, defs elements, etc.) reference on multiple pages.

```
<!Element docResources EMPTY>
<!ATTLIST docResources
    offset %Integer; #REQUIRED
    byteCount %Integer; #REQUIRED >
```

Attribute Definitions:

offset="<integer>": The byte offset from the beginning of the document file to the start of the shared resource definitions.

byteCount="<integer>": The length of the shared resource definitions in bytes.

[docDirectoryInfo Element]

The docDirectoryInfo element specifies the number of pages in the SVG document and contains the required docPageDir element. This element also may contain the optional docThumbnailDir and docAttributes elements.

```
<!Element docDirectoryInfo (docPageDir, docThumbnailDir?,
    docAttributes?)>
<!ATTLIST docDirectoryInfo
    pageCount %Integer; #REQUIRED >
```

Attribute Definitions:

pageCount="<integer>": The number of pages in the SVG document.

[docAttributes Element]

The docAttributes element specifies the values of the SVG document information keys.

```
<!Element docAttributes EMPTY>
<!ATTLIST docAttributes
    author           CDATA    #IMPLIED
    creationDate     CDATA    #IMPLIED
    modifiedDate     CDATA    #IMPLIED
    title            CDATA    #IMPLIED
    subject          CDATA    #IMPLIED
    lastSavedBy      CDATA    #IMPLIED
    revisionNumber   CDATA    #IMPLIED
    applicationName  CDATA    #IMPLIED
    companyName      CDATA    #IMPLIED
    lastViewedDate   CDATA    #IMPLIED
    lastViewedBy     CDATA    #IMPLIED
    keywords         CDATA    #IMPLIED
    originalFileName CDATA    #IMPLIED >
```

Attribute Definitions:

author="<cdata>": Document author's name.

creationDate="<cdata>": Date the document was created using this format "year/month/day hour:minutes:seconds".

modifiedDate="<cdata>": Date the document was last modified.

title="<cdata>": Title of the document.

subject="<cdata>": Subject of the document.

lastSavedBy="<cdata>": Name of individual that last modified the document.

revisionNumber="<cdata>": Document revision number.

applicationName="<cdata>": Name of application which created the SVG document.

companyName="<cdata>": Name of company which created the document.

lastViewedDate="<cdata>": Date the document was last viewed.

lastViewedBy="<cdata>": Name of individual that last viewed the document.

keywords="<cdata>": Document search keywords.

originalFileName="<cdata>": Original file name of the document.

[docPageDir Element]

The docPageDir element contains one docPageInfo element for each page in the SVG document.

```
<!Element docPageDir (docPageInfo+)>
<!ATTLIST docPageDir>
```

Attribute Definitions:
None.

[docThumbnailDir Element]

The docThumbnailDir element contains one docThumbnailInfo element for each page thumbnail present in the SVG document.

```
<!Element docThumbnailDir (docThumbnailInfo*)>
<!ATTLIST docThumbnailDir>
```

Attribute Definitions:
   None.

[docPageInfo Element]

The docPageInfo element specifies the page number, location (byte offset from the beginning of the file) and size (byte count) of a page in the SVG document. The optional color attribute specifies whether the page uses colors other then white, black, or gray (if not specified, default is false).

```
<!Element docPageInfo EMPTY>
<!ATTLIST docPageInfo
    pageNumber %Integer; #REQUIRED
    offset %Integer; #REQUIRED
    byteCount %Integer; #REQUIRED
    width %Length; #REQUIRED
    height %Length; #REQUIRED
    color (true | false) #IMPLIED >
```

Attribute Definitions:

pageNumber="<integer>": The page number this element describes. The first page is 1.

offset="<integer>": The byte offset from the, beginning of the document file to the pageStart element.

byteCount="<integer>": The length of the page definition elements in bytes.

width="<length>": The width of the page in real number format optionally followed by a standard unit identifier such as pt, cm, or in.

height="<length >": The height of the page in real number format optionally followed by a standard unit identifier such as pt, cm, or in.

color="<true|false>": Indicates whether the page uses colors other then white, black, or gray.

[docThumbnailInfo Element]

The docThumbnailInfo element contains the definition of the graphics for a page thumbnail. The required pageNumber attribute specifies the page number of the SVG document page the thumbnail represents.

```
<!Element docThumbnailInfo (image)>
<!ATTLIST docThumbnailInfo
    pageNumber %Integer; #REQUIRED >
```

Attribute Definitions:

pageNumber "<integer>": The page number this element defines the thumbnail for. The first page is 1.

AN EXAMPLE

A simple example of an SVG-based document with plural pages is provided below. There are exactly two pages, the first page consisting only of the text "Page one" and the second page consisting only of the text "Page two". The SVG-based document includes global resources in the form of a clip path, and further includes directory information according to the invention.

The example also highlights that the SVG-based document need not include an explicit reference to the DTD with which the element types conform. Rather, it is sufficient for the element types to conform to the DTD, even if a reference to the DTD is not given explicitly:

```
<?xml version="1.0" standalone="no"?>
<!-- Canon SVG Driver Copyright (C) 2001 Canon Inc. -->
<svg width="612pt" height="792pt">
<docDirectoryExists offset="59"/>
<defs><!-- SVG: commonly used clippath -->
<clipPath id="clipPath0">
<rect x="21.3" y="482.4" width="18.25" height="7.57"/>
</clipPath>
</defs>
<text x="15.0" y="16.6">Page one</text>
. . .
<text x="15.0" y="16.6">Page two</text>
. . .
<docDirectoryInfo pageCount="2">
    <docPageDir>
        <docPageInfo pageNumber="1" offset="308"
            byteCount="1235" width="612.000pt"
            height="792.000pt"/>
        <docPageInfo pageNumber="2" offset="1543"
            byteCount="2357" width="8.5in" height="11in"
            color="true"/>
    </docPageDir>
    <docThumbnailDir>
        <docThumbnailInfo pageNumber="1">
            <image x="0" y="0" width="18" height="23"
              xlink:href="data:image/png;base64, . . . " />
        </docThumbnailInfo>
    </docThumbnailDir>
    <docAttributes author="Loren Wood"
        creationDate="2001/11/28 17:05:43"
        title="SVG Document Directory Element Definitions"
        revisionNumber="0.10"
        .
        .
        ./>
</docDirectoryInfo>
<directoryTableList>
    <docDirectoryDefs offset="3900" byteCount="423"/>
    <docResources offset="163" byteCount="145"/>
</directoryTableList>
<docDirectoryTable offset="0204" byteCount="0145"/>
</svg>
```

[SVG Viewer 47]

Figures 3, 3A:
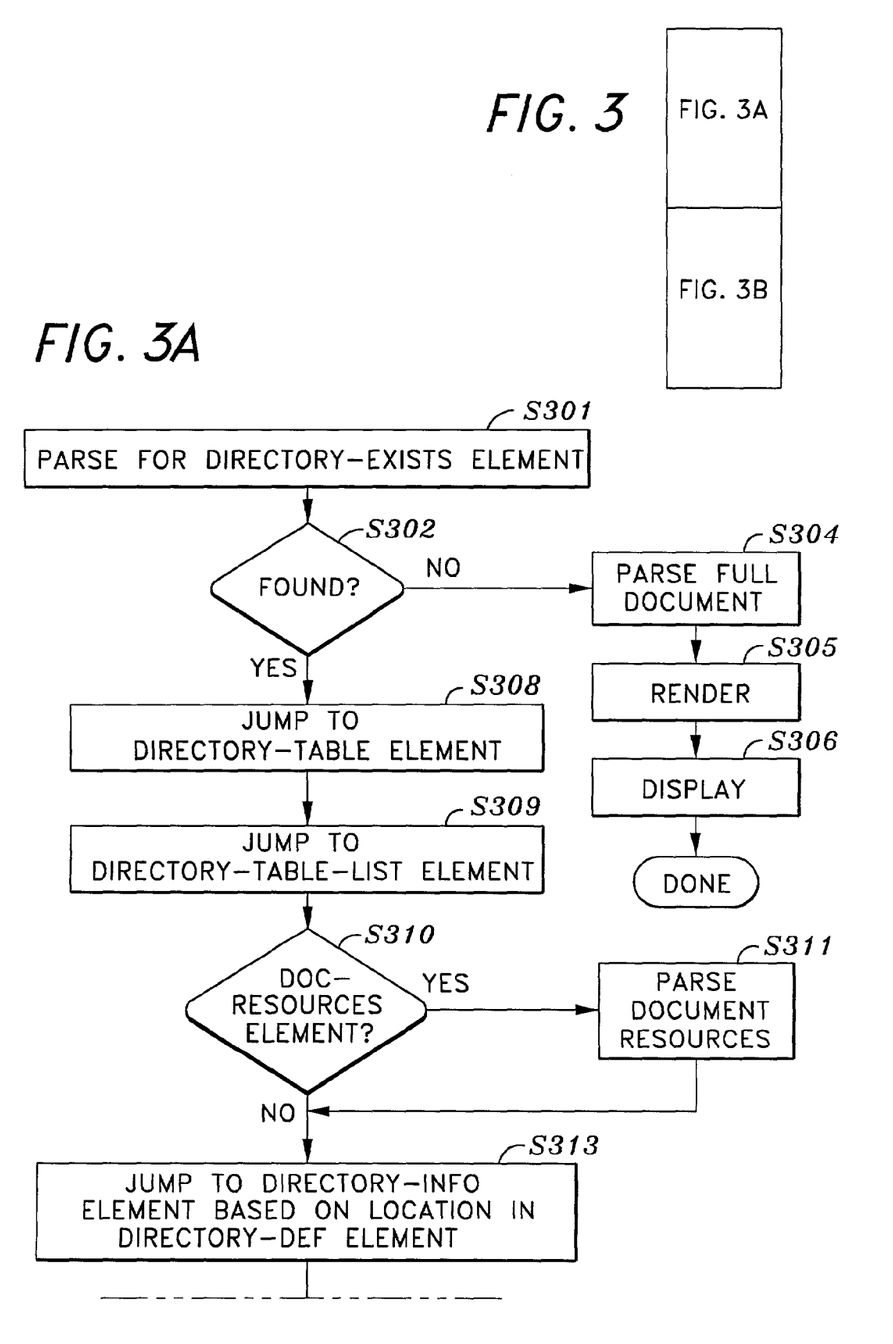
FIG. 3 is a flow diagram for explaining a document viewer according to the invention.
Figure 3B:
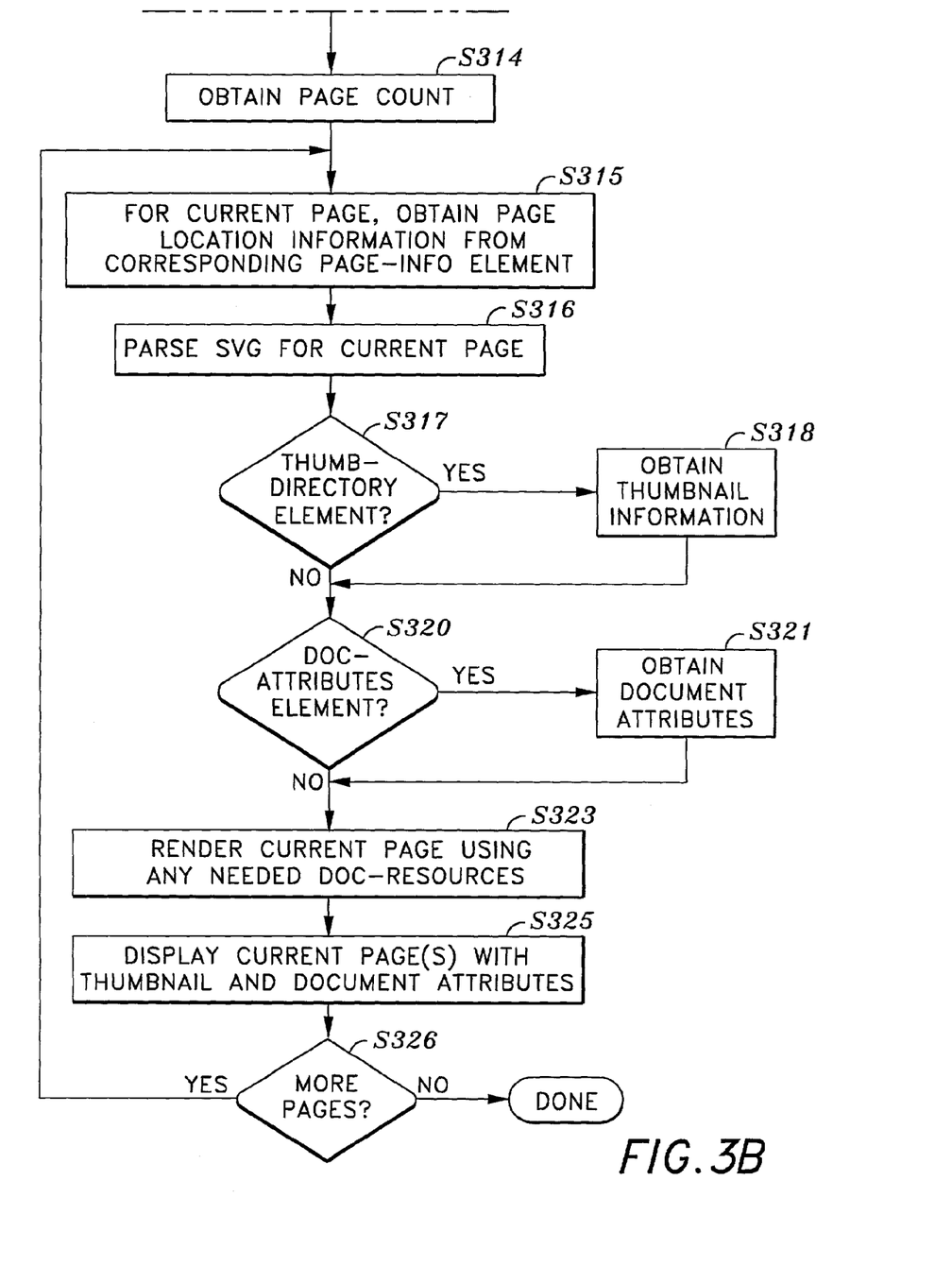

FIG. 3 is a flow diagram illustrating operation of SVG viewer 47 in parsing, rendering and displaying SVG documents including multi-page SVG documents having directory information according to the invention.

Briefly, according to FIG. 3, SVG viewer 47 determines whether document directory information for a multi-page SVG document exists, and if such information exists, SVG viewer 47 obtains location information corresponding to the text of each page in the multi-page document. SVG viewer 47 also obtains location information for document resources used by one or more of the pages, or used globally by the entire document. Based on this information and on the current page being viewed, SVG viewer 47 parses text for the current page and renders the current page using any document resources needed for the current page. The rendered page is thereafter displayed to the user on monitor 12, together with any thumbnail or document attribute information that might be included in the document directory.

In more detail, in step S301 SVG viewer 47 parses for a directory-exists element. If no such element is found (step S302), then flow branches to step S304 in which viewer 47 parses the entire SVG document, renders it (step S305), and displays it (step S306), all in accordance with known techniques for parsing, rendering and displaying SVG documents that do not include multi-page information.

If a directory-exists element is found, flow continues with step S308 in which viewer 47 jumps to the directory-table element and, based on the location pointer in the directory-table element, thereafter jumps to the directory-table-list element (step S309). If the directory-table-list element contains a document-resources element (step S310), then flow branches to step S311 in which viewer 47 parses document resources at the locations pointed by the text in the document-resources element. In either event, flow thereafter continues in step S313 in which viewer 47 jumps to the directory-information element based on the location pointer contained in the directory-definition element of the directory-table-list element.

In step S314, viewer 47 obtains the page count from the directory-information element. For the current page, execution of step S315 causes viewer 47 to obtain page location information from a corresponding page-information element or elements, depending on whether information for each page is grouped together within the multi-page SVG document.

In step S316, viewer 47 parses the SVG document for text at the location for the current page. Ordinarily, viewer 47 will parse the SVG document only for the current page, to the exclusion of other pages, such that the parsing and rendering process is faster than otherwise would have been performed according to steps S304 through S306 in cases where the document directory does not exist.

If a thumbnail-directory element exists (step S317), then viewer 47 obtains corresponding thumbnail information (step S318). Likewise, if the document-attribute element exists (step S320), then viewer 47 obtains corresponding document attribute information (step S321).

In step S323, viewer 47 renders the current page (or pages) using any needed document resources obtained in step S311. Thereafter, in step S325, viewer 47 displays the current page with thumbnail and document attributes, if such exist. If a request is received to display a new page (step S326), flow returns to step S315 to repeat the process for the newly-requested page.

Figure 4:
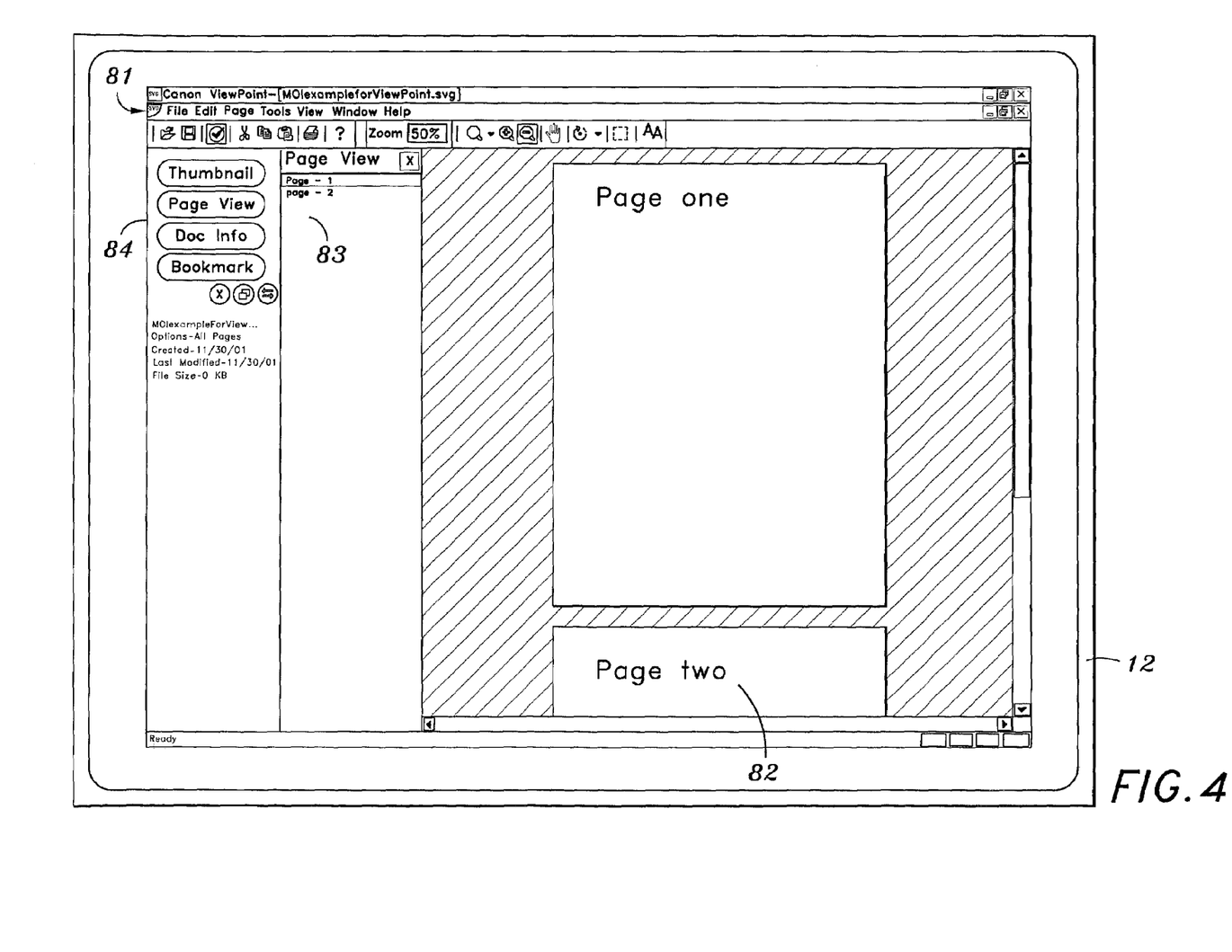
FIG. 4 is a view illustrating the display of multi-page documents by a document viewer.

FIG. 4 is a view illustrating the output of viewer 47 upon processing of the SVG-based document provided in the example above. As shown in FIG. 4, viewer 47 provides a display window 81 on monitor 12 which includes a page display area 82, a thumbnail display area 83, and a attribute area 84. The page display area 82 includes a full rendering of one or more current pages in accordance with steps S323 and S325. The thumbnail area 83 displays any thumbnails displayed in steps S317 and S318, whereas any document attributes obtained in steps S320 and S321 are displayed in attribute area 84.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A structured document stored in a computer-readable memory medium, the structured document comprising:

text for plural pages, wherein the text for each page is delimited by plural element types respectively defining at least one of vector graphic shapes of figures and text, and wherein each element type has an opening tag and a corresponding closing tag which collectively conform to a document type definition that defines rules for the plural element types; and page-information text which is delimited by page-information element types each defining an identifier for a page and a location for the page in the structured document for the text for a corresponding page of the plural pages of the structured document;

wherein the location provides direct access to a page in the structured document independent of parsing of all of the plural pages of the structured document.

2. A structured document according to claim 1, further comprising page-directory text which includes the page-information text, the page-directory text being delimited by page-directory element types which contain at least one page-information element for each of the plural pages.

3. A structured document according to claim 2, further comprising directory-information text which includes the page-directory text, the directory-information text being delimited by directory-information element types that specify the number of the plural pages and which contains the page-directory elements.

4. A structured document according to claim 3, wherein the directory-information text farther includes thumbnail-information text that defines a graphic for each of the plural pages, the thumbnail-information text being delimited by thumbnail-information element types.

5. A structured document according to claim 3, farther comprising document-attribute text delimited by document-attribute element types and tat specify attributes of the document.

6. A structured document according to claim 4, further comprising thumbnail-directory text which includes the thumbnail-information text and which is delimited by thumbnail-directory element types.

7. A structured document according to claim 1, further comprising a directory-table-list element that includes the document-resource text and at least an indirect reference to the page-information text.

8. A structured document according to claim 7, further comprising document-directory-table text delimited by document-directory-table types and that provides location information of the directory-table-list text.

9. A structured document according to claim 1, wherein the page-information text is included in document-directory information stored in the structured document.

10. A structured document according to claim 9, wherein the document-directory information is stored at or near the end of the structured document.

11. A structured document according to claim 10, further comprising a directory-exists element delimited by directory-exists element types, the directory-exists elements directly or indirectly defining the location of the document-directory information, the directory-exists element being located at or near the beginning the structured document.

12. A structured document according to claim 1, wherein the structured document is comprised of an SVG-based document.

13. A structured document according to claim 1, further comprising document-resource text that includes a location pointer in the structured document for resources used by the plural pages in the structured document.

14. A viewer for rendering at least one of vector graphic shapes of figures and text based on a structured document including text for plural pages, wherein the text for each page is delimited by plural element types each having an opening tag and a corresponding closing tag which collectively conform to a document type definition that defines rules for the plural element types, comprising:

a parsing device that detects a current page from plural pages, obtains a location of text in the structured document corresponding to the current page in reference to page-information text in the structured document, wherein the page-information text includes an identifier for the current page and a location for the current page in the structured document, and parses text in the structured document at the location corresponding to the current page; and an output device that outputs a vector graphic shape which is rendered on the basis of the text parsed by the parsing device.

15. A viewer according to claim 14, wherein said parsing device obtains a location of document-resource text in the structured document for resources used by the plural pages.

16. A method of rendering at least one of vector graphic shapes of figures and text based on a structured document including text for plural pages, wherein the text for each page is delimited by plural element types each having an opening tag and a corresponding closing tag which collectively conform to a document type definition that defines rules for the plural element types, comprising the steps of:

detecting a current page from plural pages,
obtaining a location of page-information text in the structured document, wherein the page-information text includes an identifier for the current page and a location for the current page in the structured document,
parsing text at the location in the structured document corresponding to the current page,
outputting a vector graphic shape which is rendered on the basis of the parsed page description text.

17. A method according to claim 16, farther comprising a step of obtaining a location of document-resource text in the structured document for resources used by the plural pages.

18. Computer readable medium for storing a program which performs a method of rendering at least one of vector graphic shapes of figures and text based on a structured document including text for plural pages, wherein the text for each page is delimited by plural element types each having an opening tag and a corresponding closing tag which collectively conform to a document type definition that defines rules for the plural element types, the method comprising the steps of:

detecting a current page from plural pages,
obtaining a location of page-information text in the structured document, wherein the page information text includes an identifier for the current page and a location for the current page in the structured document,
parsing text at the location in the structured document corresponding to the current page, and
outputting a vector graphic shape which is rendered on the basis of the parsed page description text.

19. Computer readable medium according to claim 18, wherein the method further comprises a step of obtaining a location of document-resource text in the structured document for resources used by the plural pages.

* * * * *

UNITED STATES PATENT AND TRADEMARK OFFICE
CERTIFICATE OF CORRECTION

| | |
|---|---|
| PATENT NO. | : 7,055,092 B2 |
| APPLICATION NO. | : 10/004447 |
| DATED | : May 30, 2006 |
| INVENTOR(S) | : Richard K. Yardumian et al. |

It is certified that error appears in the above-identified patent and that said Letters Patent is hereby corrected as shown below:

<u>COLUMN 1</u>
      Line 11, "relate," should read --relates--.

<u>COLUMN 3</u>
      Line 52, "include," should read --includes--.

<u>COLUMN 9</u>
      Line 26, "the," should read --the--.

<u>COLUMN 12</u>
      Line 25, "father" should read --further--; and
      Line 27, "tat" should read --that--.

<u>COLUMN 14</u>
      Line 3, "farther" should read --further--.

Signed and Sealed this

Twenty-sixth Day of December, 2006

JON W. DUDAS
*Director of the United States Patent and Trademark Office*